United States Patent [19]

Miyazaki et al.

[11] Patent Number: 4,544,605
[45] Date of Patent: Oct. 1, 1985

[54] PHOSPHOR

[75] Inventors: Tomohiro Miyazaki; Hitoshi Tanaka; Goro Matsumoto; Noboru Matsuhisa; Susumu Omatoi, all of Odawara, Japan

[73] Assignee: Kasei Optonix, Ltd., Tokyo, Japan

[21] Appl. No.: 525,722

[22] Filed: Aug. 23, 1983

[30] Foreign Application Priority Data

Aug. 23, 1982 [JP] Japan .................. 57-145994

[51] Int. Cl.$^4$ .............................. C09K 11/00
[52] U.S. Cl. ................. 428/404; 252/301.6 F; 428/403; 428/690; 428/691; 428/701; 428/702
[58] Field of Search ............ 428/403, 404, 406, 690, 428/691, 917, 701, 702; 252/301.6 S, 301.6 F

[56] References Cited

U.S. PATENT DOCUMENTS 4,020,231  4/1977  Hedler et al. .............. 428/403

FOREIGN PATENT DOCUMENTS

| 47-13881 | 4/1972 | Japan | 252/301.6 S |
| 48-75485 | 10/1973 | Japan | 252/301.6 S |
| 55-81445 | 6/1980 | Japan | 252/301.6 S |

*Primary Examiner*—Jack Cooper
*Attorney, Agent, or Firm*—Oblon, Fisher, Spivak, McClelland & Maier

[57] ABSTRACT

A phosphor having formed on its surface generally spherical or semi-spherical surface treating substance composed of silicon dioxide, an aluminum compound and a zinc compound, at least 70% by weight of the surface treating substance being in the form of particles having an average particle size within a range of from 60 to 300 mμm.

2 Claims, 10 Drawing Figures

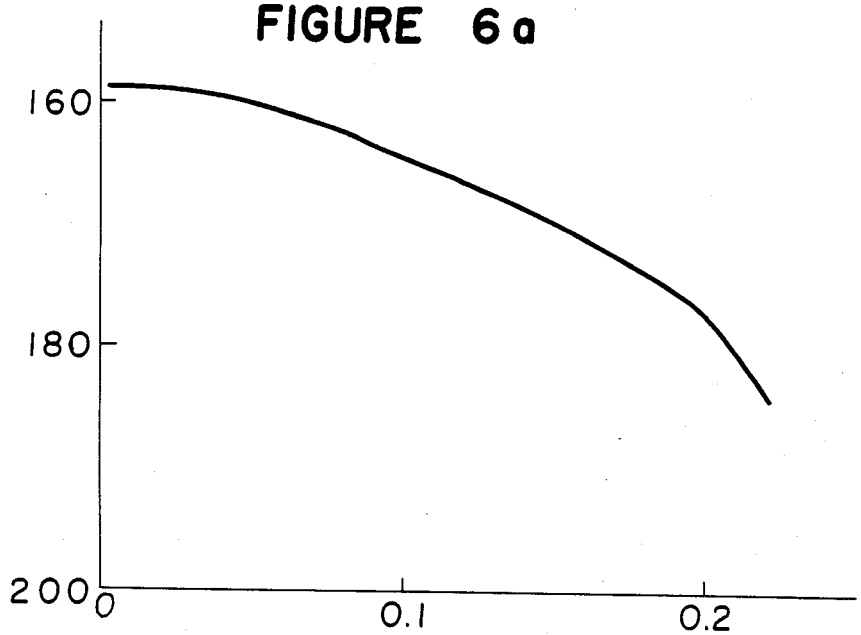
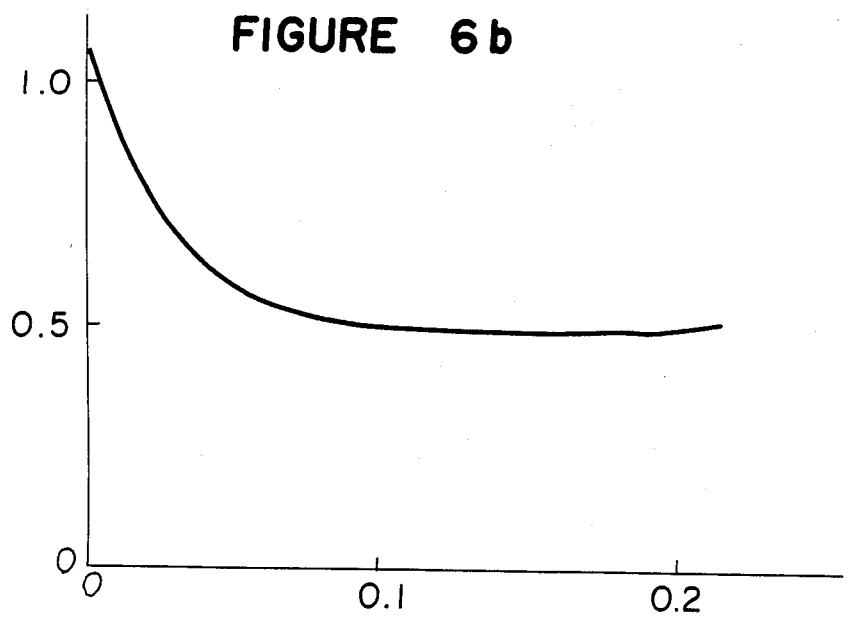

PHOSPHOR

The present invention relates to a phosphor having formed on its surface a surface treating substance composed of silicon dioxide, an aluminum compound and a zinc compound. More particularly, the present invention relates to a phosphor particularly useful for a color image receiving tube or other cathode-ray tubes.

To be used for a color image receiving tube or the like, phosphors capable of emitting different colors are respectively applied to a face plate usually in a pattern of stripes or dots. It is common to apply various surface treating agents to the surfaces of the phosphors to improve the adhesion of the phosphors to the glass surface or to prevent the color mixing (i.e. the cross contamination) with other phosphor layers designed to emit different colors. As such surface treating substances, silicate compounds, aluminate compounds, phosphate compounds, metal oxides, etc. have been known. Especially, from the viewpoint of the efficiency for the treatment, silicate compounds have long been used most commonly. As such silicate compounds, silicon dioxide, zinc silicate and aluminum silicate are known. Further, various methods of treatment with them have been proposed to attain the above mentioned effects, for instance, a method in which a continuous coating layer is formed on the entire surface of a phosphor, or a method in which a coating layer is formed with fine particles.

However, such conventional surface treating substances and conventional methods of treatment with them have had drawbacks such that they do not provide sufficient adhesion of the phosphors to the glass surface or they do not adequately serve to prevent the cross contamination. Reflecting the progress in recent years in the technology for high precision image receiving tubes, it is required to form finer patterns of the phosphor layers and yet it is desired to provide a high color purity. Accordingly, there is a strong demand for surface treatment which is capable of providing superior effectiveness with respect to the above mentioned requirements.

It is therefore an object of the present invention to adequately satisfy such requirements. Namely, it is intended to provide a surface-treated phosphor which has strong adhesion to the glass surface and yet is capable of minimizing the cross contamination.

Namely, the present invention provides a phosphor having formed on its surface generally spherical or semi-spherical surface treating substance composed of silicon dioxide, an aluminum compound and a zinc compound, at least 70% by weight of the surface treating substance being in the form of particles having an average particle size within a range of from 60 to 300 m$\mu$m.

Now, the present invention will be described in detail with reference to the preferred embodiment.

In the accompanying drawings, FIG. 1 is an electron microscopic photograph (29,000 magnifications) of the phosphor of the present invention.

Figure 4A:
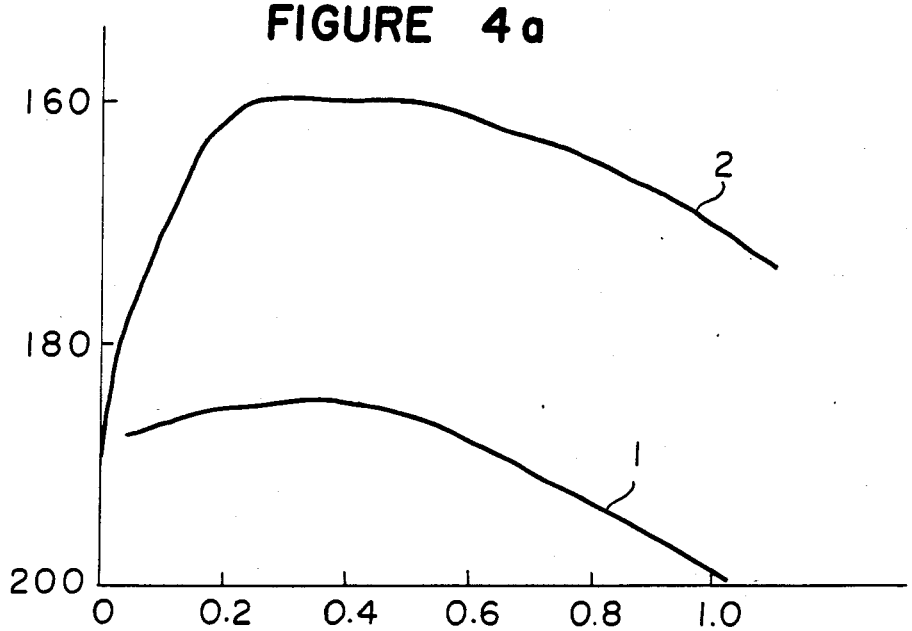
Figure 5A:
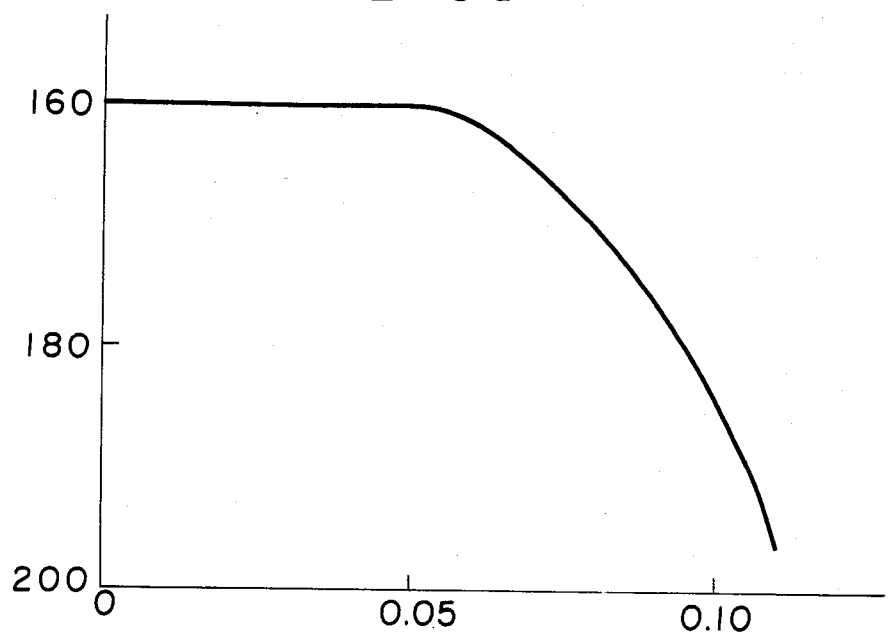

FIGS. 4a, 5a and 6a respectively illustrate the changes in the minimum stripe width when the proportions of the components of the surface treating substance of the phosphor of the present invention were varied.

Figure 4B:
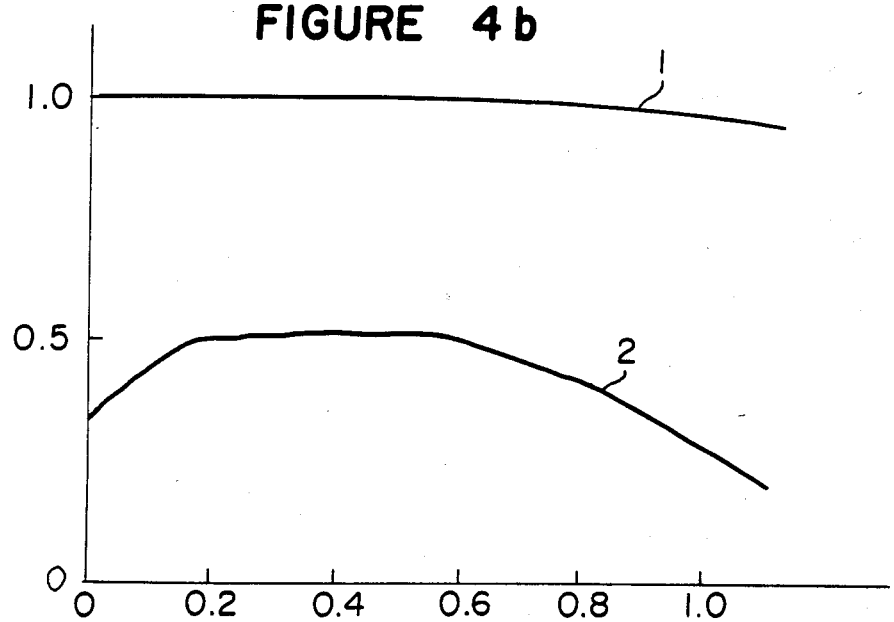
Figure 5B:
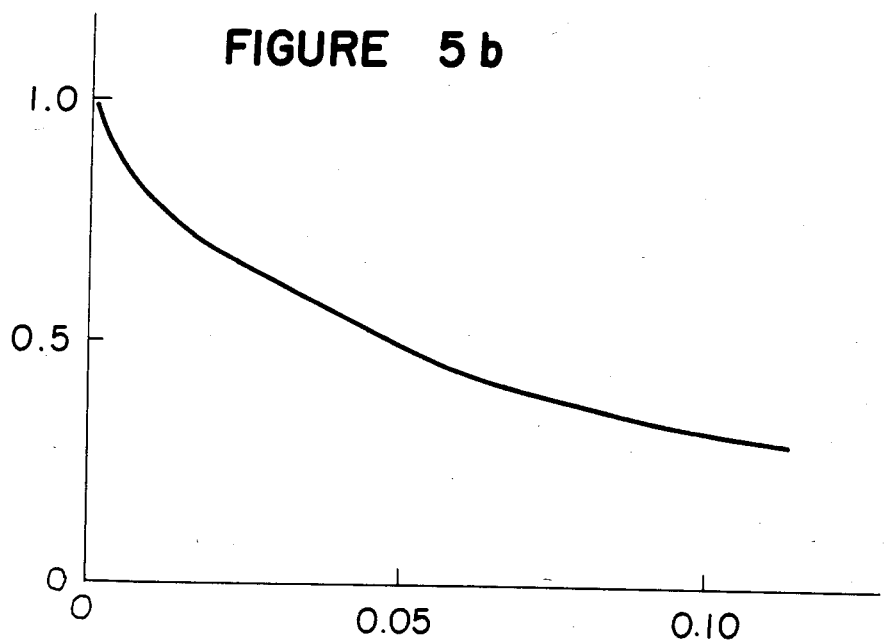

FIGS. 4b, 5b and 6b respectively illustrate the changes in the glass surface fogging when the proportions of the components of the surface treating substance of the phosphor of the present invention were varied.

The phosphor of the present invention is prepared, for instance, by the following process.

Firstly, a phosphor is suspended in deionized water, and while stirring the suspension, predetermined amounts of silicon dioxide such as colloidal silica or powdery silica, an aluminum salt such as aluminum sulfate and a zinc salt such as zinc sulfate, are added in this order to the suspension. Then, the pH of the suspension is adjusted to from 7.5 to 10 with an aqueous alkaline solution such as an aqueous ammonium hydroxide solution or an aqueous sodium hydroxide solution, and the suspension is left to stand still, whereupon a desired phosphor having the surface treating substance precipitated on its surface is obtained. An example of an electron microscopic photograph (29,000 magnifications) of the phosphor of the present invention thus obtained, is shown in FIG. 1.

Figure 2:
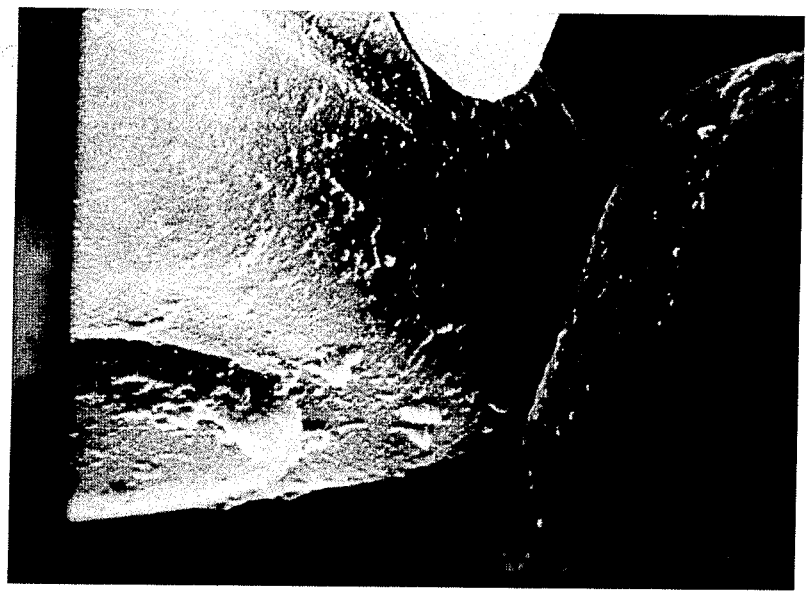
FIG. 2 is an electron microscopic photograph (29,000 magnifications) of a conventional phosphor.

The surface treating substance formed on the surface of the phosphor of the present invention is different in the composition from the conventional surface treating substance. Besides, it has an additional feature that its configuration is entirely different from that of the conventional surface treating substance, for instance, as is evident from the surface condition of the conventional phosphor surface-treated with zinc silicate, as illustrated by the electron microscopic photograph (29,000 magnifications) in FIG. 2.

Figure 1:
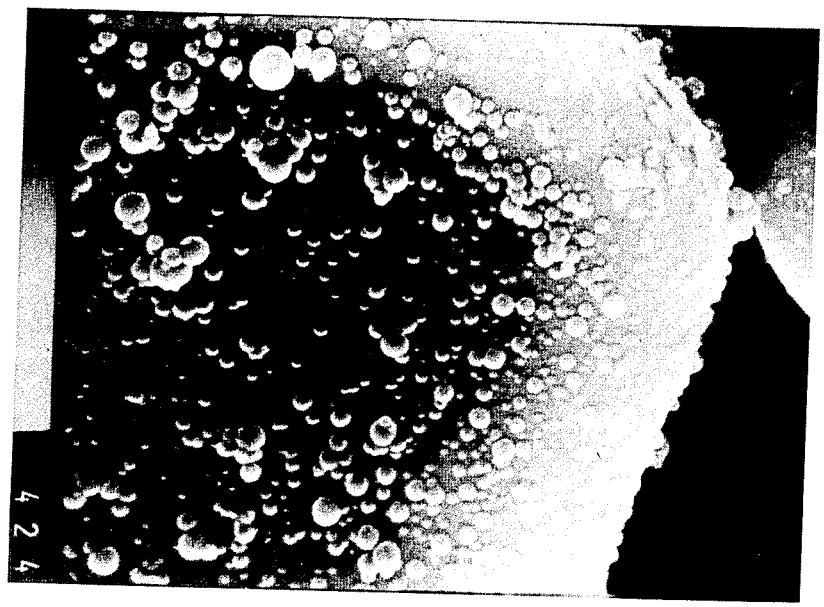

The present inventors have made an extensive study on the relationship between the configuration and particle size of the surface treating substance composed of silicon dioxide, a variety of aluminum compounds and zinc compounds and the effects of the present invention, and as a result, have found that with respect to the configuration, the desired effects of the present invention are obtainable when the surface treating substance is formed on the surface of the phosphor in the form of generally spherical or semi-spherical particles as shown in FIG. 1, and with respect to the particle size, the desired effects are obtainable when it is formed in coarse particle form rather than fine particle form or flat particle form which used to be the case in the conventional phosphors. The present invention has been accomplished based on these discoveries.

From the foregoing description of the process for its formation, it should be apparent that the term "generally spherical or semi-spherical" is meant for that the surface treating substance may not necessarily be exactly spherical or semi-spherical in a strict sense.

Now, the present invention will be described in further detail with reference to the drawings.

Figure 3A:
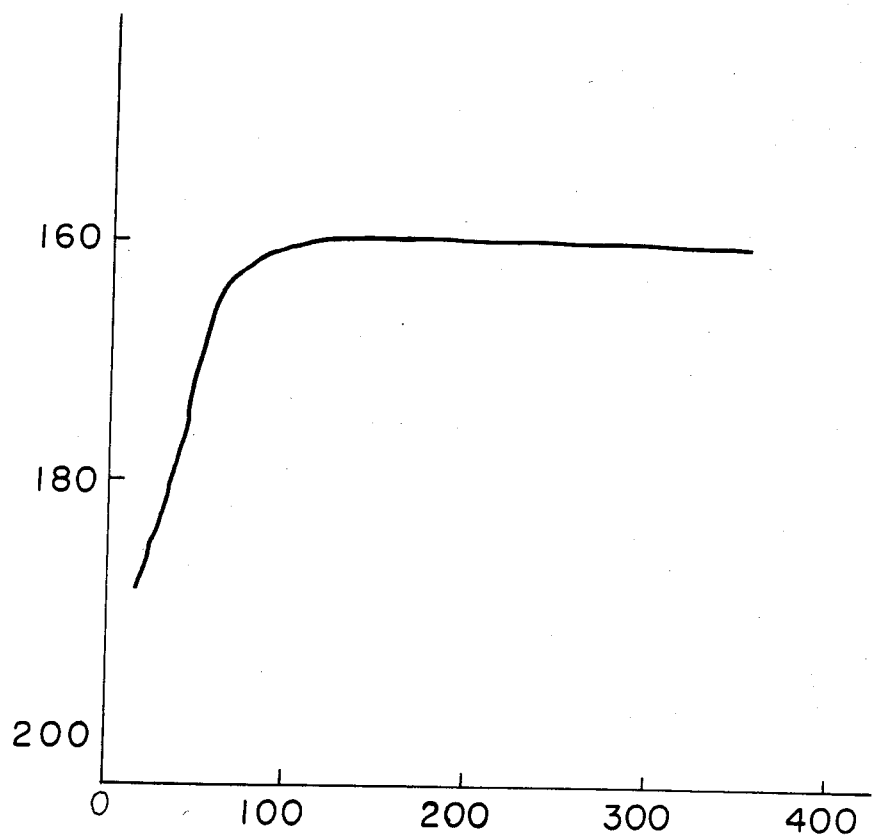
FIG. 3a illustrates the change in the minimum stripe width when the particle size of the surface treating substance of the phosphor of the present invention was varied.

Firstly, FIG. 3a illustrates the relationship between the average particle size of the above mentioned surface treating substance formed on the phosphor surface in a spherical or a semi-spherical form and the minimum stripe width.

(In the present invention, the surface treating substance is prepared by a chemical method which will be described hereinafter. Therefore, in some cases, very fine particles will be formed which can hardly be detected even by an electron microscope. However, from the observation of the adhesion of the phosphors to the glass surface, it has been found that coarse particles of the surface treating substance are the main contributors to the effectiveness. Therefore, for the purpose of the present invention, such fine particles that are hardly detectable are negligible and accordingly excluded from the determination of the average particle size. Namely, in the present invention, the average particle size is obtained with respect to particles corresponding to 70% by weight of the total surface treating substance as counted from the coarse particle side. For the determination of the minimum stripe width in the present invention, phosphor layers are printed by stepwisely changing the exposure of the ultraviolet ray for the formation of the phosphor layers and then they were washed with water, whereupon the width of the stripe formed with minimum exposure is taken as the minimum stripe width. Therefore, the smaller the value is, the greater the adhesion strength of the phosphor to the glass surface is.)

As shown in FIG. 3a, the phosphor of the present invention presents a greater minimum stripe width when the average particle size of its surface treating substance is smaller. Thus, with an increase of the average particle size, the minimum stripe width tends to be small, and when the average particle size exceeds a certain value, the minimum stripe width will no longer change. Namely, as the average particle size increases, the adhesion strength tends to increase. However, once its value reaches about 60 m$\mu$m, the adhesion strength will no longer substantially increase even with an increase of the average particle size.

Figure 3B:
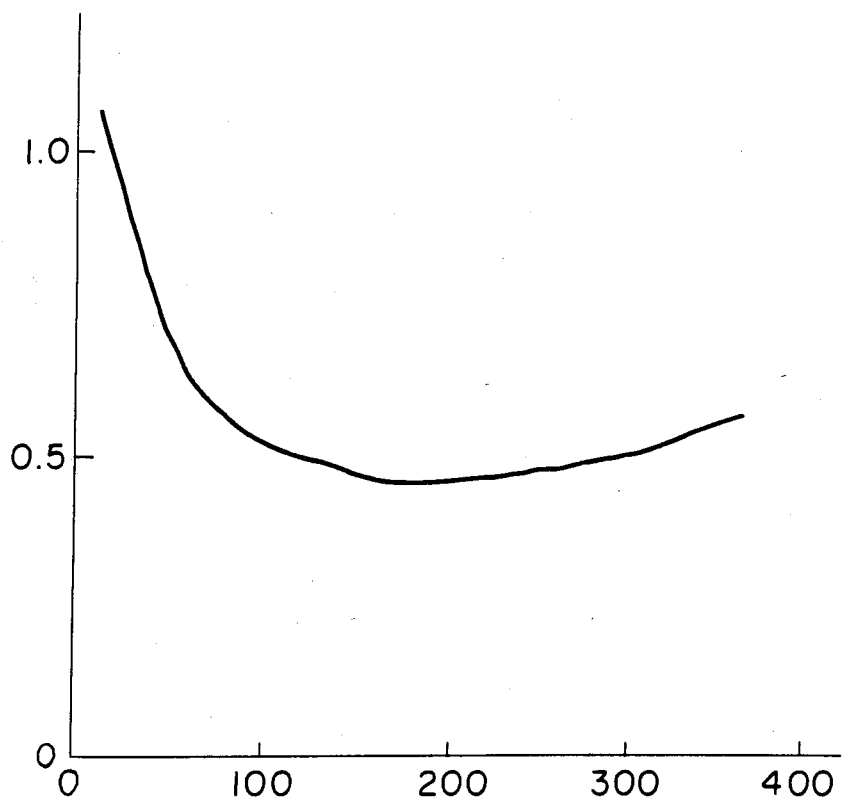
FIG. 3b illustrates the change in the glass surface fogging when the particle size of the surface treating substance of the phosphor of the present invention was varied.

FIG. 3b illustrates a relationship between the average particle size of the surface treating substance and the glass surface fogging.

(The "glass surface fogging" here is evaluated by the number of phosphors remaining in a predetermined surface area of a nonexposed portion at the time of the exposure of stripes, and represented by a relative value based on the value of the conventional product being set to be 1.0. The phosphors remaining in the nonexposed portion gives rise to cross contamination when another phosphor is subsequently formed as a phosphor layer at the nonexposed portion and thus lowers the color purity.)

As shown in FIG. 3b, the phosphor of the present invention has a feature that when the average particle size of its surface treating substance is small, the glass surface fogging is great, and with an increase of the average particle size, the glass surface fogging tends to decrease. The glass surface fogging becomes minimum when the particle size is from about 60 to 300 m$\mu$m. Even when the average particle size of the surface treating substance increases beyond 300 m$\mu$m, the above effectiveness will not substantially change. Such an excessive increase of the average particle size is likely to lead to e.g. protrusions of the surface treating substance, and thus tends to lead to deterioration of the coating quality (e.g. smoothness) of the phosphor layer or a decrease of the coating density, whereby e.g. the luminescence tends to be lowered.

For the above mentioned reasons, the average particle size of the surface treating substance for the phosphor of the present invention should be within a specified range of from 60 to 300 m$\mu$m. In order to obtain a superior coating quality or luminescence, the particle size is preferably from 70 to 200 m$\mu$m, as is evident from the Figure.

Further, the present inventors have conducted various researches also with respect to the constituent materials of the surface treating substance, particularly with respect to the relationships between the contents of silicon dioxide, aluminum and zinc and the minimum stripe width or the glass surface fogging. As a result, it has been unexpectedly found that a remarkable effectiveness is obtainable within certain specific ranges. This discovery will be described with reference to FIGS. 4a, 4b, 5a, 5b, 6a and 6b.

In FIGS. 4a and 4b, curves 2 represent the changes in the minimum stripe width and the glass surface fogging, respectively, when the silicon dioxide content in the surface treating substance was varied while maintaining the aluminum content and the zinc content in the surface treating substance to be 0.05 parts by weight and 0.05 parts by weight, respectively, relative to 100 parts by weight of the phosphor. On the other hand, curves 1 represent the changes in the minimum stripe width and the glass surface fogging, respectively, when the surface treating substance having the same composition was formed in fine particle form like the configuration of the conventional surface treating substance.

From these Figures, it is evident that the coarse particles of the surface treating substance according to the present invention always show substantially superior effects as compared with the conventional fine particles of the surface treating substance, even if the proportion of silicon dioxide was varied.

Further, it is evident from the Figures that particularly with respect to the minimum stripe width, an excellent effect is obtainable when the silicon dioxide content is from 0.01 to 1.0 parts by weight relative to 100 parts by weight of the phosphor, and the particularly preferred range is from 0.1 to 0.9 part by weight.

FIGS. 5a and 5b show the changes in the minimum stripe width and the glass surface fogging, respectively, when the aluminum content in the surface treating substance was varied while maintaining the silicon dioxide content and the zinc content in the surface treating substance to be 0.3 part by weight and 0.05 part by weight, respectively, relative to 100 parts by weight of the phosphor.

From these Figures, it is evident that good effects can be obtained when the aluminum content is at most 0.1 part by weight, particularly from 0.01 to 0.09 part by weight, relative to 100 parts by weight of the phosphor.

FIGS. 6a and 6b show the changes in the minimum stripe width and the glass surface fogging when the zinc content in the surface treating substance was varied while maintaining the silicon dioxide content and the aluminum content in the surface treating agent to be 0.3 part by weight and 0.05 part by weight, respectively, relative to 100 parts by weight of the phosphor.

From these Figures, it is evident that the zinc content is preferably within a range of from 0.003 to 0.25 part by weight, more preferably from 0.02 to 0.20 part by weight, relative to 100 parts by weight of the phosphor.

In the foregoing, typical examples of the present invention have been described. As a result of a number of further experiments, however, the present inventors have ascertained that the desired effects of the present invention can satisfactorily be obtained when the surface treating substance contains silicon dioxide, aluminum in the aluminum compound and zinc in the zinc compound in amounts of from 0.01 to 1.0 part by weight, at most 0.1 part by weight and from 0.003 to 0.25 part by weight, respectively, relative to 100 parts by weight of the phosphor. The effects of the phosphor of the present invention are as follows:

The phosphor of the present invention exhibits excellent adhesion or bonding to the glass surface.

It provides a fine phosphor layer having an excellent pattern.

Its adhesion to an unnecessary portion is minimum. Therefore, the cross contamination is minimized, and accordingly a phosphor layer having a high color purity is obtainable.

Now, the present invention will be described in further detail with reference to Examples.

EXAMPLE 1

To 1 kg of a green-emitting phosphor (ZnS: Cu, Al), 3 l of pure water was added, and while thoroughly stirring the mixture, 13.2 ml of colloidal silica ($SiO_2$ content: 0.3 part by weight per 100 parts by weight of the phosphor), 62 ml of a 10% alminum sulfate aqueous solution (aluminum content: 0.05 part by weight per 100 parts by weight of the phosphor) and 22 ml of a 10% zinc sulfate aqueous solution (zinc content: 0.05 part by weight per 100 parts by weight of the phosphor) were added successively in this order. The mixture was adjusted to pH 8 with an aqueous solution of 1N NaOH. The mixture was left to stand still. After removing the supernatant by decantation, the mixture was washed with water and, after removal of water, dried at a temperature of 150° C. for 5 hours, followed by sieving for finishing. The surface condition of the phosphor thus obtained is shown in FIG. 1. The surface treating substance thereby deposited, contained silicon dioxide, aluminum and zinc in amounts of 0.29 part by weight, 0.045 part by weight and 0.045 part by weight, respectively, relative to 100 parts by weight of the phosphor. With use of this phosphor, the above mentioned minimum stripe width and glass surface fogging were measured, whereby it was found that an excellent stripe finer by 20 μm in the stripe width than that obtained with the conventionally surface-treated phosphor (see FIG. 2), was obtained, and the glass surface fogging was lower by 40%.

EXAMPLE 2

A phosphor was prepared in the same manner as in Example 1 except that 6.8 ml of colloidal silica ($SiO_2$ content: 0.3 part by weight per 100 parts by weight of the phosphor) was used instead of the colloidal silica used in Example 1. The surface condition of the phosphor thereby obtained was substantially the same as that shown in the electron microscope photograph of FIG. 1. The surface treating substance thereby deposited, contained silicon dioxide, aluminum and zinc in amounts of 0.31 part by weight, 0.046 part by weight and 0.045 part by weight, respectively, relative to 100 parts by weight of the phosphor.

With use of this phosphor, the above mentioned minimum stripe width and glass surface fogging were measured, whereby it was found that an excellent stripe finer by 25 μm in the stripe width than that obtained with the conventionally surface-treated phosphor, was obtained, and the glass surface fogging was lower by 50%.

EXAMPLE 3

A phosphor was prepared in the same manner as in Example 1 except that a blue-emitting phosphor (ZnS: Ag) was used instead of the phosphor used in Example 1. The surface condition of the phosphor thereby obtained was substantially the same as that shown in the electron microscopic photograph of FIG. 1. The surface treating substance thereby deposited, contained silicon dioxide, aluminum and zinc in amounts of 0.28 part by weight, 0.046 part by weight and 0.046 part by weight, respectively, relative to 100 parts by weight of the phosphor. With use of this phosphor, the above mentioned minimum stripe width and glass surface fogging were measured, whereby is was found that an excellent stripe finer by 30 μm in the stripe width than that obtained with the conventionally surface-treated phosphor was obtained, and the glass surface fogging was lower by 40%.

We claim:

1. A phosphor having formed on its surface a surface treating substance having a generally spherical shape, wherein said surface treating substance is composed of $SiO_2$ in amounts of 0.01 to 1.0 part by weight, an aluminum compound wherein the amount of aluminum in the aluminum compound is at most 0.1 part by weight, and a zinc compound wherein the amount of zinc in the zinc compound is from 0.003 to 0.25 part by weight, all of said parts by weight being relative to 100 parts by weight of the phosphor; the amount of aluminum being sufficient to effect a lower glass surface fogging than said surface treating substance absent the aluminum compound; at least 70% by weight of the surface treating substance having an average particle size within a range of from 60 to 300 mμm.

2. The phosphor according to claim 1, wherein said average particle size is within a range of from 70 to 200 mμm.

* * * * *